United States Patent [19]
Emmett

[11] 4,442,229
[45] * Apr. 10, 1984

[54] REGENERATION OF ION EXCHANGE MATERIALS

[75] Inventor: James R. Emmett, Brewood, England

[73] Assignee: Northern Engineering Industries plc, England

[*] Notice: The portion of the term of this patent subsequent to Nov. 3, 1998 has been disclaimed.

[21] Appl. No.: 468,196

[22] Filed: Feb. 22, 1983

[30] Foreign Application Priority Data

Mar. 30, 1982 [GB] United Kingdom ................. 8209291

[51] Int. Cl.³ .............................................. B01J 49/00
[52] U.S. Cl. ..................................... 521/26; 210/662; 210/675
[58] Field of Search ....................... 210/662, 675, 686; 209/158–161; 521/26

[56] References Cited

U.S. PATENT DOCUMENTS

| | | | |
|---|---|---|---|
| 4,191,644 | 3/1980 | Lembo et al. | 210/675 |
| 4,264,439 | 4/1981 | Lefevre et al. | 210/675 |
| 4,298,696 | 11/1981 | Emmett | 210/675 |

Primary Examiner—Ivars C. Cintins

[57] ABSTRACT

In a method of regenerating mixed ion exchange materials, the materials are classified into layers. The lower layer is then transferred from the separator vessel. The transfer is controlled by detecting an interface between materials. The separated materials are then regenerated after which the anion material is reclassified to allow any contaminant cation material to settle to the bottom thereof. Material is then removed from the bottom of the anion layer to remove settled contaminant cation material. The removed material is isolated from the regenerated materials which are then remixed.

The method reduces the cross-contamination of materials that occurs during the separation of classified materials and, particularly, reduces the amount of cation material in the sodium form (following regeneration of the anion material) that is eventually returned to service.

1 Claim, 2 Drawing Figures

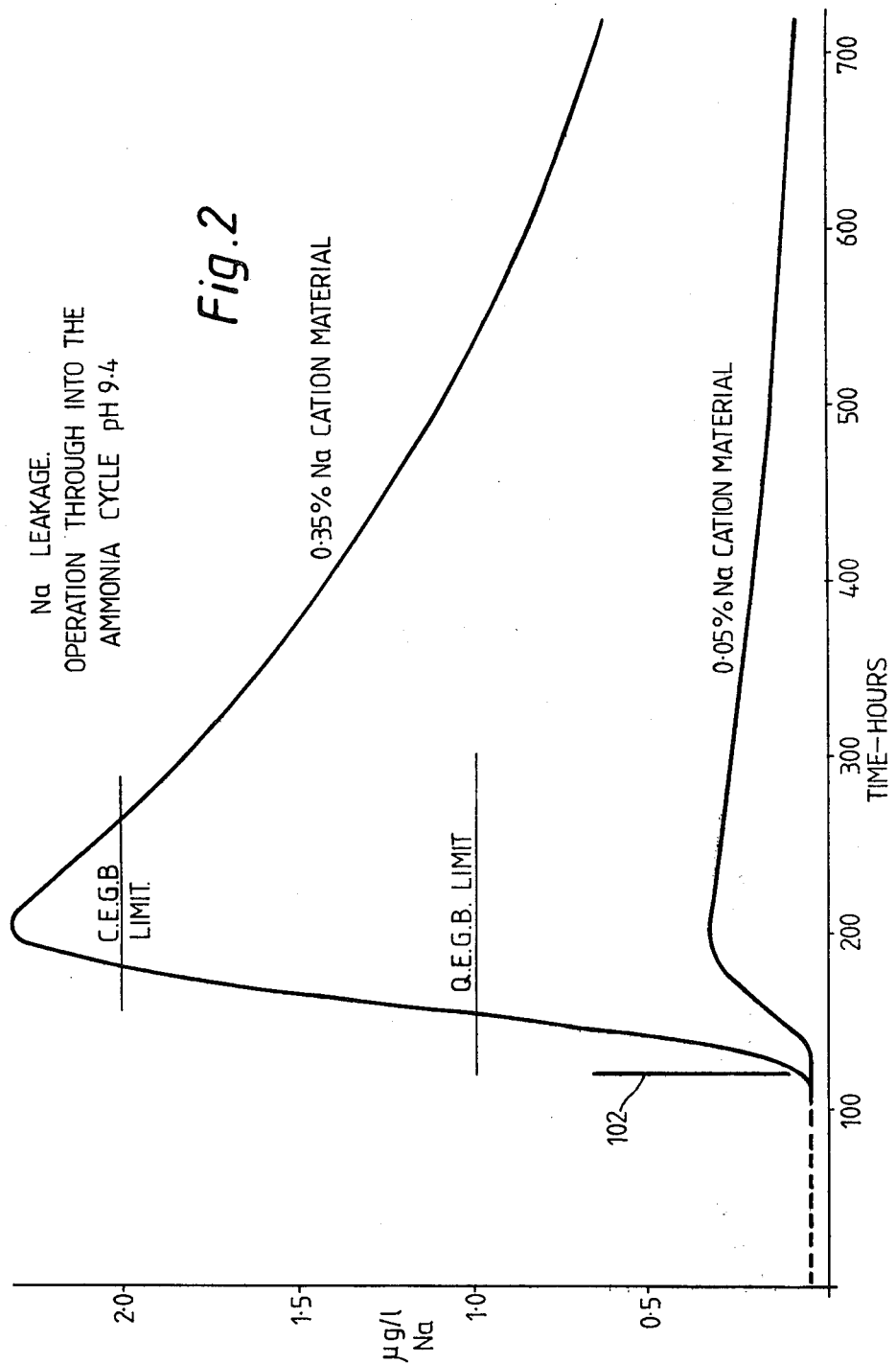

REGENERATION OF ION EXCHANGE MATERIALS

BACKGROUND TO THE INVENTION

The invention relates to the regeneration of ion exchange materials.

High purity water can be obtained from mixed-bed water treatment units such as condensate polishers in boiler water treatment plant. In order to maintain the quality of the treated water, it is necessary to minimise the deleterious effects which occur because either type of ion exchange material is unavoidably contacted by the regenerant appropriate for the other type. The ion exchange materials are classified before regeneration and cross-contamination of either type of material by the other to some degree is unavoidable. For example, contaminant cation type material present in the anion type is converted to the sodium form by the sodium hydroxide regenerant used to regenerate the anion type material and may give rise to a leakage of sodium ions into the treated water to the detriment of the boiler and the turbine. Sodium ions are quite readily displaced from the sodium form cation material by other ions.

Prior proposals to avoid such effects have involved regenerating the materials in separate vessels. Such methods involved transferring the upper anion material layer from a separator vessel, in which the materials had been classified, to an anion regeneration vessel. The transfer of anion material generally results in the transfer of relatively large amounts of contaminant cation material to the anion regeneration vessel. Typically, contaminant cation material could be 5% by volume of the material transferred. In some methods the regenerated anion material was treated, for example, with ammonia or calcium hydroxide to displace the sodium ions from the contaminant cation material. In another method the anion material was regenerated using a regenerant having a density intermediate the densities of the two types of material, giving a separating effect which removed the contaminant cation type material.

In an alternative proposal, described in U.S. Pat. No. 4,298,696 issued to Emmett, such cross-contamination of materials is minimised. U.S. Pat. No. 4,298,696 describes a method in which, following classification, material is transferred from the bottom of a separator vessel and the transfer flow is monitored to determine when one type of material has left the separator vessel. Transfer of materials by this method leaves the interfacial region between the materials relatively undisturbed so that contamination of one type of material with another is minimised. The interfacial region can comprise an inert material having a density intermediate the densities of the cation and anion materials. Alternatively, the interfacial region can comprise anion and cation materials in which case the interfacial region is isolated from the relatively pure volumes of anion and cation materials at least during regeneration of those materials.

However, even using the improved method described in U.S. Pat. No. 4,298,696, it has been found that a relatively small amount, typically of the order of 0.2 to 0.5% by volume, of cation material may be dispersed in the anion material. To ensure that customer requirements on water purity are met, it is preferable to minimise any contribution even that small amount of contaminant cation material may make to sodium leakage. It is particularly important to minimise such contribution when ammonia is added to boiler condensate to raise the pH of the condensate to minimise corrosive effects. In that situation, as the ammonia exhausts the cation material, ammonium ions progressively displace sodium ions from the cation material down the bed until the sodium ions leak into the treated water. However, the cation material still functions as an exchange material with respect to sodium and other ions even though it is in the ammonium form when, for example, a condenser tube leaks and introduces those ions into the top of the bed. Operation of the condensate polisher in such circumstances is usually referred to as operation through into the ammonia cycle.

SUMMARY OF THE INVENTION

The object of the invention is to provide a method of regenerating ion exchange materials in which sodium leakage in subsequent service use is reduced.

According to the invention, a method of regenerating particulate anion and cation ion exchange materials comprises classifying the materials above a perforate barrier in a separator vessel into an upper anion material layer, an intermediate interfacial region and a lower cation material layer by passing water upwardly within the vessel, transferring cation material from the vessel through a conduit having an inlet adjacent the barrier and an outlet outside the vessel by passing water into the vessel and allowing flow through the conduit until a major proportion of cation material has passed through said outlet of the conduit, a major proportion of material from the interfacial region has entered the conduit and a major proportion of anion material remains in said separator vessel, detecting an interface in the conduit between materials, isolating said outlet from said inlet in response to detection of said interface, regenerating at least said major proportions of cation and anion materials, reclassifying the regenerated anion material by passing water upwardly therethrough to allow any contaminant cation material present in the anion material to settle to the bottom of the anion material, removing material from the bottom of the anion material to remove settled contaminant cation material, said removed material being isolated from the regenerated materials and remixing the regenerated materials.

BRIEF DESCRIPTION OF THE DRAWINGS

Methods of regenerating ion exchange materials will now be described by way of example only to illustrate the invention with reference to the accompanying drawings, in which:

FIG. 2 is a graph in which micrograms/liter ($\mu/l$) of sodium ion leakage into boiler condensate is plotted against the time the ion exchange materials have been in service.

DESCRIPTION OF THE PREFERRED EMBODIMENTS

Figure 1:
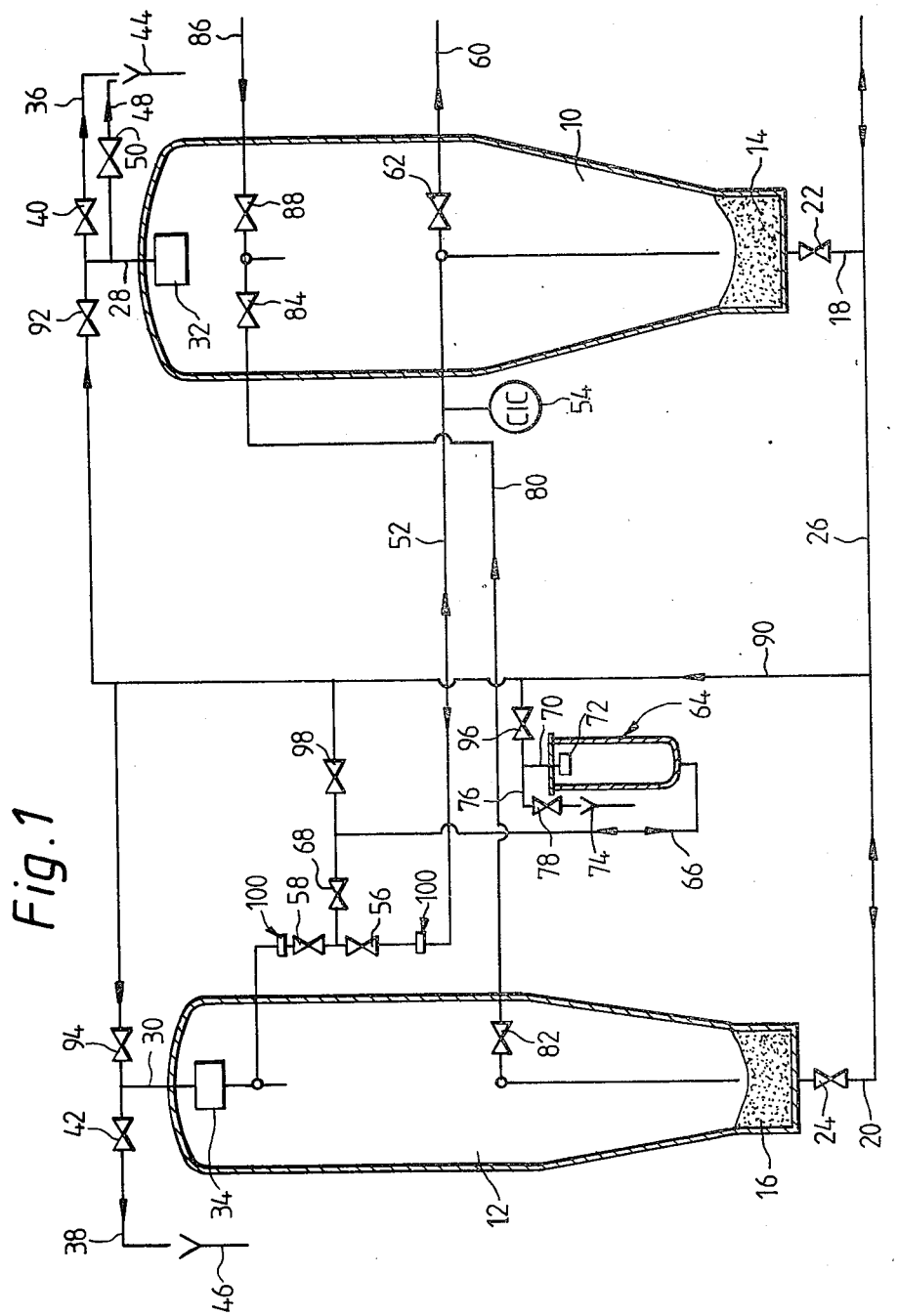
FIG. 1 shows diagrammatically apparatus by which the methods can be performed.

The apparatus shown in FIG. 1 is similar to that described in specification U.S. Pat. No. 4,298,696.

The apparatus has a separator and anion regeneration vessel 10 and a cation regeneration vessel 12. The vessels 10 and 12 have respective perforate barriers 14 and 15, consisting of epoxy resin bonded sand for example, in their bases. The barriers 14, 16 permit the passage of liquid while retaining ion exchange materials thereon. The vessels 10 and 12 are connected at their lower ends below the respective barriers 14 and 16 to a drain and to a supply of mixed-bed quality deionised water via respective inlet/outlet pipes 18 and 20 flow through which is controlled by valves 22 and 24, respectively. The water supply pipe 26 is shown but the drain connection is not shown.

The vessels 10 and 12 have respective inlet/outlet pipes 28 and 30 at their upper ends. The pipes 28 and 30 have respective strainers 32 and 34 at their ends in the vessels. The ends of the pipes 28 and 30 outside the vessels are connected respectively to pipes 36 and 38, flow through which is controlled by valves 40 and 42, which lead to drain at 44 and 46. A further pipe 48, flow through which is controlled by a valve 50, additionally connects the pipe 28 to the drain at 44 for a purpose to be described below.

A transfer conduit 52 has an inlet in the vessel 10 adjacent the barrier 14 and an outlet in the vessel 12 above the barrier 16. A detector in the form of a conductivity cell 54 is located in the conduit 52. Flow through the conduit 52 is controlled by valve means in the form of two valves 56 and 58.

A pipe 60, flow through which is controlled by a valve 62, is connected to the conduit 52 between the valve 56 and the vessel 10 for the transfer of materials from the vessel 10 to a storage or service unit (not shown).

The conduit 52 is connected to the base of an isolation vessel 64 by a pipe 66 flow through which is controlled by a valve 68. The pipe 66 is connected to the conduit 52 at a position intermediate the valves 56 and 58, which are close together.

The isolation vessel 64 has an inlet/outlet pipe 70 which has a strainer 72 at its end in the vessel 64 and is connected to drain at 74 by a pipe 76, flow through which is controlled by a valve 78, at its end outside the vessel 64.

A second transfer conduit 80 has an inlet in the vessel 12 adjacent the barrier 16 and an outlet in the vessel 10 above the barrier 14. Flow through the conduit 80 is controlled by valve means in the form of two valves 82 and 84. A pipe 86, flow through which is controlled by a valve 88, is connected to the conduit 80 between the valve 84 and the vessel 10 for the transfer of materials to the vessel 10 from a service unit (not shown).

The water supply pipe 26 is connected by a pipe 90, which has several branches, to the ends of the pipes 28, 30 and 70 which are external to their respective vessels and to the pipe 66 between the vessel 64 and the valve 68. Flow of water from the pipe 26 through the branches of the pipe 90 is controlled by valves 92, 94, 96 and 98, respectively.

Other pipework, for example for air supply, venting and regenerant supply, has been omitted to simplify the figure.

Mixed anion and cation ion exchange materials which are to be regenerated are transferred from a service unit (not shown), for example a condensate polisher, to the vessel 10 through the pipe 86, the valve 88 and the extreme end of the conduit 80, the valve 84 being closed.

Air and water are introduced into the vessel 10 through pipe 18 to subject the materials to a preliminary air scouring and backwashing operation to remove dirt. Following the backwashing step, a controlled flow of water is introduced into the vessel 10 through pipe 18 to classify the materials into an upper anion material layer, an interfacial region consisting of a mixture of anion and cation materials and a lower cation material layer. Water leaves the vessel 10 through the pipe 28 and the valve 40 and goes to drain 44 through the pipe 36. Preferably, the controlled flow is relatively high for an initial period and is then reduced to a smaller flow for the remaining period during which classification of the materials occurs. Typically, the flow rates are selected to give velocities in the parallel-sided portion of the vessel 10 of the order of 12 meters/hour (m/h) and 8 m/h, respectively.

Once classification is complete, the flow of water into the vessel 10 is adjusted to a flow rate suitable for transferring material from the vessel 10. Valve 40 is closed and valves 56 and 58 are opened and cation material is hydraulically transferred from vessel 10 through the conduit 52 to the vessel 12. The vessel 10 is maintained full of water during transfer so that, as the level of the top of the anion layer descends, water flows up through the materials to make up the volume of the material as it leaves the vessel. Thus a classifying flow is maintained during transfer. As the transfer of cation material from the vessel 10 is nearly completed, the rate of transfer is preferably slowed down by opening the valve 50 so that water flows out of the vessel 10 through the control valve 50 and the flow through the conduit 52 is reduced to a low rate.

As the transfer proceeds, the conductivity cell 54 detects an interface between materials. In this instance, the interface is between relatively pure cation material and relatively pure anion material and is substantially coextensive with the interfacial region. The interface is detected by a fall in conductivity as material from the interfacial region passes the cell 54.

In response to the detection of the interface by the cell 54, the valve 58 is closed, after a suitable timed delay, to isolate the inlet from the outlet of the conduit 52 to leave substantially pure cation material only downstream of the valve 58. As the materials differ in colour, the conduit 52 can be provided with windows 100, for example, so that an operator can determine (or subsequently check) what the delay period should be by visually checking in the windows when the material type in the conduit 52 changes following detection of an interface by the cell 54. At the same time that valve 58 is closed, valve 68 is opened so that continued transfer of materials from the vessel 10 causes materials from the interfacial region to flow through pipe 66 into the isolation vessel 64. After a suitable timed interval, during which substantially all the materials from the interfacial region are passed to the vessel 64, the valves 50 and 56 are closed and the flow of water into the vessel 10 is stopped by closing valve 22.

The valves 56 and 98 and then 58 and 98 are operated to allow water to flow from the pipe 26 to flush the relatively pure anion material and relatively pure cation material from the conduit 52 into the respective vessels 10 and 12.

The materials in each vessel 10 and 12 are then subjected to a main air scouring and backwashing operation, followed by regeneration with suitable regenerants, for example sodium hydroxide solution for the anion material and sulphuric acid solution for the cation material, and rinsing.

A classifying flow of water is then introduced into the vessel 10 through the pipe 18 to subject the regenerated anion material to a further classification process.

As previously explained, the Applicant has found that, after the initial classification of the mixed materials the anion layer may have a relatively small amount of cation material, typically 0.2 to 0.5% by volume, dispersed therein. That contaminant cation material has been converted, during regeneration of the anion material, to the sodium form and it is preferred that it should be removed from the anion material prior to that material being returned to service.

The applicant has found that the sodium form of cation material has a falling rate in water some 25% or more greater than the falling rates of the hydrogen or ammonium forms of the cation material, which have similar falling rates.

Consequently, during the further classification of the regenerated anion material, the contaminant cation material, now in its sodium form, preferentially settles at the bottom of the vessel 10 below the anion material.

Following classification of the regenerated anion material, valves 56 and 68 are opened and a transfer flow of water is introduced into the vessel 10 through the pipe 18. The transfer flow of water causes material to be transferred from the vessel 10 through the conduit 52 and the pipe 66 to the isolation vessel 64. The transfer flow is maintained for a period sufficient to ensure that any settled contaminant cation material together with some anion material is transferred to the isolation vessel 64. The transfer flow of water is then stopped and valve 98 is operated to allow a flow of water from the pipe 26 to flush anion material from the conduit 52 back into the vessel 10.

The regenerated cation material is transferred from the vessel 12 to the vessel 10 through the conduit 80 by introducing a transfer flow of water into the vessel 12 through the pipes 20 and 30 and opening valves 82 and 84. Once transfer of the cation material has been completed the regenerated cation and anion materials are mixed in the vessel 10 and are then transferred through the conduit 52 and the pipe 60 either back to the service unit or to a storage vessel for subsequent use in a service unit.

The mixture of materials held in the isolation vessel 64 is then transferred to the vessel 10 to await the next batch of mixed materials for regeneration. The transfer is accomplished by flow of water from the pipe 26 by closure of the valves 58 and 98 and the opening of the valves 56, 68 and 96. If necessary, following the transfer the conduit 52 given a final flush with water by closing the valve 96 and opening the valves 56, 68 and 98.

It will be understood that the vessels will be connected to drain or vented as necessary during the various operations described above with reference to FIG. 1.

In the method described above with reference to FIG. 1, the mixed materials from the interfacial region and the contaminant cation material which has been converted to the sodium form are both isolated from the regenerated materials which are returned to service.

Tests on a plant showed that, using the method according to the invention, very low levels of cation material remain in the anion material following removal of the settled contaminant cation material after reclassification of the regenerated anion material. The results of the tests are given in Table I below.

TABLE I

| Test No. | A* | B** |
| --- | --- | --- |
| 1 | 0.385 | 0.053 |
| 2 | 0.235 | 0.055 |
| 3 | 0.45 | 0.04 |

TABLE I-continued

| Test No. | A* | B** |
| --- | --- | --- |
| 4 | 0.81 | 0.053 |

*the figures quoted in column A are the percentages by volume of cation material remaining in the anion material following transfer of the cation material from the separator vessel but prior to regeneration of the materials.
**the figures quoted in column B are the percentages by volume of cation material remaining in the anion material following removal of the settled contaminant cation material after reclassification of the regenerated anion material.

In the particular system on which the tests were performed, the cation material to anion material ratio was 2:1. Consequently, the percentage by volume of cation material in the sodium form which was returned to service was of the order of 0.02 to 0.275%. In other systems in which the ratio if 1:1, the percentage would be of the order of 0.05%.

On the graph (FIG. 2), two curves have been plotted. One curve shows the sodium leakage calculated for a system in which the percentage of cation material in the sodium form is 0.05% (i.e. a typical figure which is achievable using the present invention) and the other curve shows the sodium leakage calculated for a system in which the percentage of cation material in the sodium form is 0.35% (i.e. a typical figure which is achievable using the invention described in U.S. Pat. No. 4,298,696). The sodium leakages have been calculated for systems which are operated through into the ammonia cycle. The line marked 102 indicates the end of the period during which substantially all of the cation material is converted into the ammonium form. The two limit lines marked on the graph are the current maximum levels of sodium leakage which are acceptable to the Central Electricity Generating Board (C.E.G.B.), England and the Queensland Electricity Generating Board (Q.E.G.B.), Australia for systems which are operated through into the ammonia cycle.

In an alternative form of the method described above with reference to FIG. 1, the mixed materials of the interfacial region are not transferred to the isolation vessel 64. Thus, both of the valves 56 and 58 are closed after the delay period has elapsed. The valves 56, 68 and 98 and then the valves 58, 68 and 98 are then operated to flush, respectively, anion material and materials from the interfacial region which are predominantly anion material into the vessel 10 and cation material and materials from the interfacial region which are predominantly cation material into the vessel 12. The subsequent steps of the method, i.e. regeneration of the materials, the reclassification of the anion material and the isolation of the settled contaminant cation material in the vessel 64, are then carried out as described above with reference to FIG. 1.

Other modifications are possible within the scope of the invention.

For example, instead of holding materials in the isolation vessel 64, the conduit 52 could have a length and volume sufficient to hold those materials. The regenerated and remixed materials would then be transferred from the vessel 10 either through the conduits 52 and 60 (suitable valve arrangements being provided) or through a different conduit. In another modification, the inlet to the conduit 52 could be coplanar with the perforate barrier, the conduit 52 extending downwardly out of the bottom of the vessel.

In a further modification, an inert particulate material may be used with the mixed materials. The inert material has a density intermediate the density of the anion and cation materials so that the interfacial region formed upon classification is substantially pure inert material as described in Pat. No. 4,298,696. In that instance, detection of either the interface between cation material and inert material or between inert material and anion material may be used to determine the transfer step. The inert material could be held either in the isolation vessel 64; or in the conduit 52; or the conduit 52 could be flushed both ways prior to regeneration to pass inert material to both of the vessels 10 and 12. The contaminant cation material separated from the regenerated anion material could be held either in the vessel 64 or the conduit 52.

What I claim is:

1. A method of regenerating particulate anion and cation ion exchange materials comprises classifying the materials above a perforate barrier in a separator vessel into an upper anion material layer, an intermediate interfacial region and a lower cation material layer by passing water upwardly within the vessel, transferring cation material from the vessel through a conduit having an inlet adjacent the barrier and an outlet outside the vessel by passing water into the vessel and allowing flow through the conduit until a major proportion of cation material has passed through said outlet of the conduit, major proportion of material from the interfacial region has entered the conduit and a major proportion of anion material remains in said separator vessel, detecting an interface in the conduit between materials, isolating said outlet from said inlet in response to detection of said interface, regenerating at least said major proportions of cation and anion materials, reclassifying the regenerated anion material by passing water upwardly therethrough to allow contaminant cation material present in the anion material to settle to the bottom of the anion material, removing material from the bottom of the anion material to remove settled contaminant cation material, said removed material being isolated from the regenerated materials and remixing the regenerated materials.

* * * * *